(12) United States Patent
Jain et al.

(10) Patent No.: US 11,964,247 B2
(45) Date of Patent: Apr. 23, 2024

(54) AUTOMATED BLENDER SYSTEM

(71) Applicant: 6D Bytes Inc., Sunnyvale, CA (US)

(72) Inventors: Vipin Jain, Saratoga, CA (US);
Venkateswaran Ayalur, Cupertino, CA (US); Vijayasimha Doddabalapur, Foster City, CA (US); Kevin Andrew Marshall, Sunnyvale, CA (US)

(73) Assignee: 6D BYTES INC., Sunnyvale, CA (US)

( * ) Notice: Subject to any disclaimer, the term of this patent is extended or adjusted under 35 U.S.C. 154(b) by 700 days.

(21) Appl. No.: 16/811,735

(22) Filed: Mar. 6, 2020

(65) Prior Publication Data

US 2021/0275981 A1 Sep. 9, 2021

(51) Int. Cl.
*B01F 35/45* (2022.01)
*A47J 43/07* (2006.01)
*B01F 35/10* (2022.01)

(52) U.S. Cl.
CPC ......... *B01F 35/451* (2022.01); *A47J 43/0716* (2013.01); *B01F 35/1452* (2022.01)

(58) Field of Classification Search
CPC ............................ B01F 35/451; A47J 43/0716
USPC ................... 366/347, 168.1, 172.2; 215/235; 220/211
See application file for complete search history.

(56) References Cited

U.S. PATENT DOCUMENTS

| | | | |
|---|---|---|---|
| 19,310 A | 2/1858 | Page | |
| 230,188 A * | 7/1880 | Konrad | B65D 47/0814 220/264 |
| 810,427 A * | 1/1906 | Owens | D06F 15/00 366/256 |
| 1,271,011 A * | 7/1918 | Bingham | B65D 39/08 215/235 |
| 1,785,585 A | 12/1930 | Humberstone et al. | |
| 2,508,939 A | 5/1950 | Swart | |
| 2,603,388 A | 7/1952 | Bryant | |
| 2,681,211 A * | 6/1954 | Reynolds | A47J 43/044 99/348 |

(Continued)

FOREIGN PATENT DOCUMENTS

WO 2017136605 8/2017
WO 2019195315 A1 10/2019

OTHER PUBLICATIONS

Extended European Search Report dated Dec. 17, 2021 for EP Application # 19781332, 10 pages.

(Continued)

*Primary Examiner* — David L Sorkin
(74) *Attorney, Agent, or Firm* — Fountainhead Law Group P.C.

(57) ABSTRACT

An apparatus includes a blender lid configured to cover an opening in a blender receptacle and a lid arm coupled to the blender lid and coupled rotationally about a first horizontal axis. The lid arm is configured to rotate about the first horizontal axis to selectively position the blender lid to cover and uncover the opening in the blender receptacle. The blender arm may rotate the blender lid about the first horizontal axis to cover the opening in the blender receptacle and apply a downward force on the blender lid to seal the opening of the blender receptacle with the blender lid. The blender arm may include a horizontal rod having a longitudinal axis that corresponds to the first horizontal axis and having a first end attached to the blender lid.

17 Claims, 15 Drawing Sheets

(56) References Cited

U.S. PATENT DOCUMENTS

| | | | |
|---|---|---|---|
| 2,849,215 A * | 8/1958 | Hurst | A62C 5/002 |
| | | | 261/DIG. 26 |
| 2,953,460 A | 9/1960 | Baker | |
| 3,502,038 A | 3/1970 | Erich | |
| 3,828,681 A | 8/1974 | Christensen et al. | |
| 3,893,599 A | 7/1975 | Birell | |
| 3,933,086 A | 1/1976 | Standing | |
| 4,084,726 A | 4/1978 | Nicol | |
| 4,286,737 A | 9/1981 | Gallant | |
| 5,132,914 A | 7/1992 | Cahlander et al. | |
| 5,207,506 A * | 5/1993 | Musseau | A21C 1/144 |
| | | | 366/601 |
| 5,386,762 A | 2/1995 | Gokey | |
| 5,809,872 A * | 9/1998 | Sundquist | A47J 43/046 |
| | | | 241/37.5 |
| 6,276,560 B1 * | 8/2001 | Belcastro | B65D 77/28 |
| | | | 220/709 |
| 6,740,570 B2 | 5/2004 | Chen et al. | |
| 7,174,830 B1 | 2/2007 | Dong | |
| 7,325,485 B2 | 2/2008 | Carhuff et al. | |
| 7,762,181 B2 | 7/2010 | Boland et al. | |
| 8,560,334 B2 | 10/2013 | Pertti | |
| 8,612,181 B2 | 12/2013 | Czaja et al. | |
| 8,672,187 B2 | 3/2014 | Ophardt | |
| 8,909,800 B1 | 12/2014 | Grebenschikov et al. | |
| 8,948,912 B2 | 2/2015 | Nakamoto et al. | |
| 9,131,807 B2 | 9/2015 | Roy et al. | |
| 9,132,873 B1 | 9/2015 | Laurence et al. | |
| 9,424,602 B2 | 8/2016 | Taniguchi et al. | |
| 9,563,372 B2 | 2/2017 | Hwang et al. | |
| 9,767,096 B2 | 9/2017 | Goldberger et al. | |
| 9,815,191 B2 | 11/2017 | Oleynik | |
| 9,883,768 B2 * | 2/2018 | Starflinger | A47J 36/10 |
| 9,940,797 B2 | 4/2018 | Lamb et al. | |
| 10,127,783 B2 | 11/2018 | Laska et al. | |
| 10,241,726 B2 | 3/2019 | Hwang et al. | |
| 10,247,126 B2 | 4/2019 | Behrendt | |
| 10,518,409 B2 | 12/2019 | Oleynik | |
| 10,601,860 B2 | 3/2020 | Mihan et al. | |
| 10,686,620 B2 | 6/2020 | Gould et al. | |
| 11,017,624 B2 | 5/2021 | Jain | |
| 2004/0173103 A1 | 9/2004 | Won | |
| 2005/0029154 A1 | 2/2005 | Kahn et al. | |
| 2005/0193901 A1 | 9/2005 | Buehler | |
| 2007/0106422 A1 | 5/2007 | Jennings et al. | |
| 2007/0187433 A1 | 8/2007 | Webster et al. | |
| 2009/0180843 A1 | 7/2009 | Jackson et al. | |
| 2011/0018406 A1 | 1/2011 | Hartsfield, Jr. et al. | |
| 2011/0090756 A1 * | 4/2011 | Farrell | B01F 27/80 |
| | | | 366/138 |
| 2011/0168707 A1 * | 7/2011 | Reeves | B22D 41/01 |
| | | | 220/211 |
| 2011/0168797 A1 | 7/2011 | Neymeyer | |
| 2013/0112529 A1 | 5/2013 | Wooldridge et al. | |
| 2013/0279288 A1 * | 10/2013 | Dong | A23G 9/44 |
| | | | 366/192 |
| 2014/0344420 A1 | 11/2014 | Rjeili et al. | |
| 2015/0058447 A1 | 2/2015 | Albisu | |
| 2015/0089497 A1 | 3/2015 | Borzycki et al. | |
| 2015/0188777 A1 | 7/2015 | Frost | |
| 2016/0052770 A1 | 2/2016 | Ratti | |
| 2016/0081515 A1 | 3/2016 | Aboujassoum et al. | |
| 2016/0179935 A1 | 6/2016 | Bhattacharjya et al. | |
| 2016/0338545 A1 | 11/2016 | Shah et al. | |
| 2017/0003046 A1 | 1/2017 | Gould | |
| 2017/0005817 A1 | 1/2017 | Gould et al. | |
| 2017/0011442 A1 | 1/2017 | Hu et al. | |
| 2017/0060629 A1 | 3/2017 | Vora et al. | |
| 2017/0063855 A1 | 3/2017 | Vajravel et al. | |
| 2017/0064045 A1 | 3/2017 | Pai et al. | |
| 2017/0116661 A1 | 4/2017 | Sundaram | |
| 2017/0139902 A1 | 5/2017 | Byron et al. | |
| 2017/0217664 A1 | 8/2017 | Burger | |
| 2017/0221296 A1 | 8/2017 | Jain et al. | |
| 2017/0328997 A1 | 11/2017 | Silverstein et al. | |
| 2018/0183860 A1 | 6/2018 | Majumdar | |
| 2018/0206060 A1 | 7/2018 | Yazdani et al. | |
| 2018/0253459 A1 | 9/2018 | Srinivasan Natesan et al. | |
| 2018/0262388 A1 | 9/2018 | Johnson et al. | |
| 2019/0033312 A1 | 1/2019 | Merbl et al. | |
| 2019/0307262 A1 | 10/2019 | Jain et al. | |
| 2019/0308318 A1 | 10/2019 | Jain et al. | |
| 2019/0308329 A1 | 10/2019 | Jain et al. | |
| 2019/0308796 A1 | 10/2019 | Jain et al. | |
| 2019/0310611 A1 | 10/2019 | Jain et al. | |
| 2019/0333312 A1 | 10/2019 | Jain et al. | |
| 2020/0090099 A1 | 3/2020 | Johnson et al. | |
| 2020/0118400 A1 | 4/2020 | Zalewski et al. | |
| 2020/0172353 A1 | 6/2020 | Jain et al. | |
| 2020/0188400 A1 | 6/2020 | Liu et al. | |
| 2021/0256796 A1 | 8/2021 | Vipin et al. | |
| 2021/0275981 A1 | 9/2021 | Jain et al. | |
| 2022/0017313 A1 | 1/2022 | Jain et al. | |
| 2022/0185573 A1 | 6/2022 | Jain et al. | |
| 2022/0207954 A1 | 6/2022 | Jain et al. | |

OTHER PUBLICATIONS

C. H. Yun, et al., "Intelligent Management of Remote Facilities through a Ubiquitous Cloud Middleware," 2009 IEEE International Conference on Cloud Computing, 2009, 7 pages.

C. Shih, et al., "Virtual Cloud Core: OpenCL Workload Sharing Framework for Connected Devices," 2013 IEEE Seventh International Symposium on Service-Oriented System Engineering, 2013, 8 pages.

D. Sulaiman, et al., "MAMoC: Multisite Adaptive Offloading Framework for Mobile Cloud Applications," 2017 IEEE International Conference on Cloud Computing Technology and Science (CloudCom), 2017, 8 pages.

International Search Report and Written Opinion dated Jun. 14, 2019 for PCT/US2019/025421, 8 pages.

International Search Report and Written Opinion from PCT Application No. PCT/US2017/016298, dated Apr. 4, 2017; 3 pages.

M. F. M. Fuzi, et al., "Virtual desktop environment on Cloud Computing Platform," 2014 IEEE 5th Control and System Graduate Research Colloquium, 2014, 5 pages.

Montgomery, J., "Is the Domino's Pizza Tracker Real?" The Huffington Post, retrieved from http://www.huffingtonpost.com/rev-joel-montgomery/dominos-pizza-tracker_b5947734.html, last updated Dec. 7, 2014, pp. 1-6.

Anonymous, "Duometer", Downloaded https://rubbermill.com/wp-content/uploads/durometer.pdf, 2022, 1 page.

Anonymous, "Rubber Properties", downloaded https://us.misumi-ec.com/pdf/fa/2010/p2121.pdf, 2022, 1 page.

Drucker et al., "Faster Secure Cloud Comparisons with a Trusted Proxy", 2017, IEEE, p. 61-67.

Hulea et al., "WiPlatform, a sensing and event processing platform", 2015, IEEE, p. 214-317.

Li et al., "Research and Implementation of Random Test Generator for VLIW DSPs", 2013, IEEE, p. 524-527.

Wang et al., Architecting a Distributed Bioinformatics Platform with iRODS and iPlant Agave API, 2016, IEEE, p. 420-423.

Non-Final Office Action dtd Dec. 31, 2019 for U.S. Appl. No. 16/051,052, 17 pgs.

Final Office Action dtd May 12, 2020 for U.S. Appl. No. 16/051,052, 18 pgs.

* cited by examiner

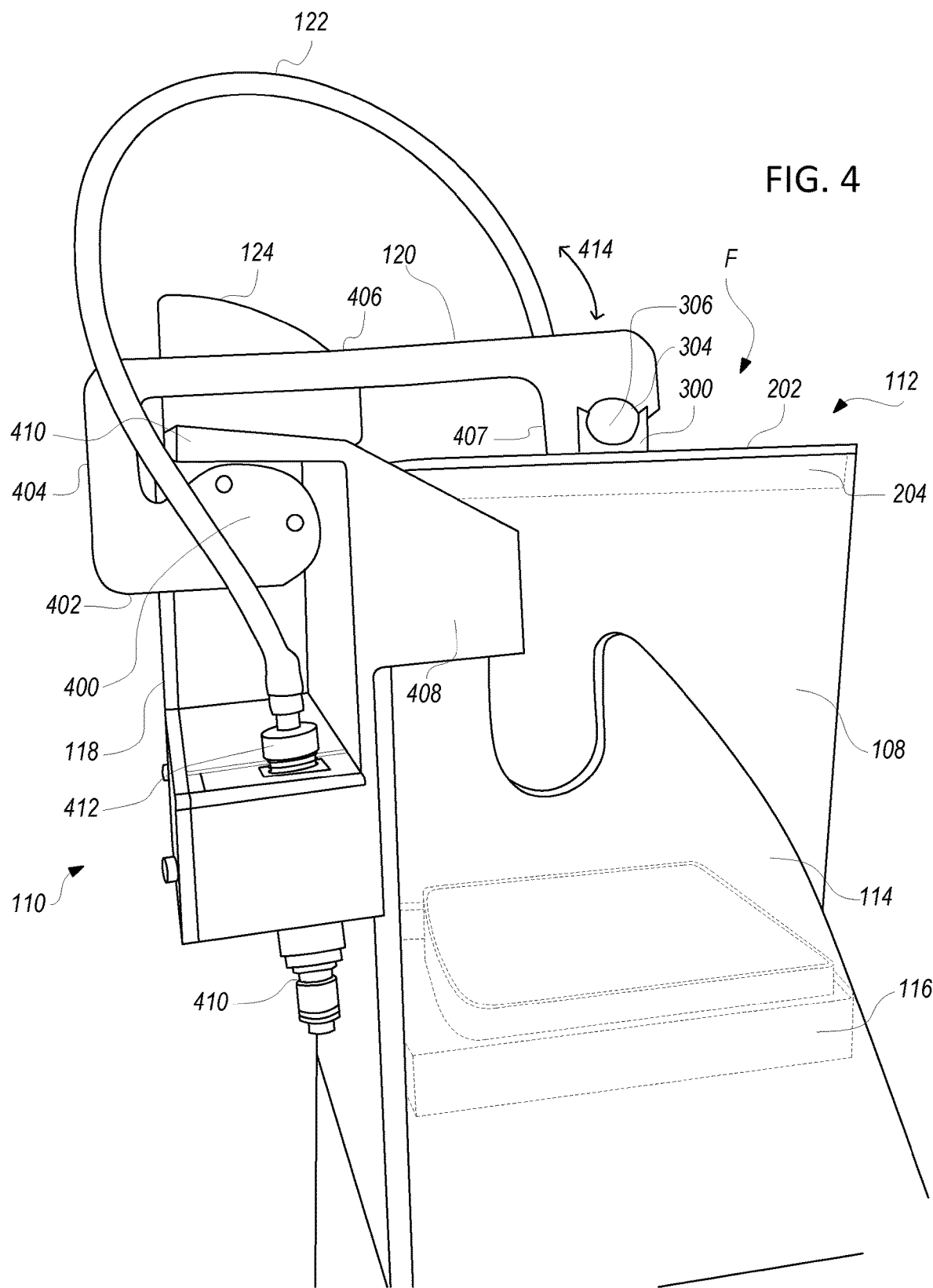

US 11,964,247 B2

AUTOMATED BLENDER SYSTEM

BACKGROUND

The present disclosure relates to apparatuses, systems, devices, and methods for automated blending.

Blenders are utilized to blend ingredients placed in a receptable of the blender. When blending food ingredients, for example, a user typically places desired ingredients in the blender receptable, places a lid on the receptacle, and then actives a motor that turns a mixing blade in the receptacle to thereby blend the ingredients. The user typically holds the lid in place on the blender during this process to prevent ingredients from being ejected from the receptacle during blending. Where this process of blending is to be automated, one challenge is securely placing the lid on the blender receptacle during blending of ingredients in the receptacle. If the lid is not securely placed on the blender receptacle, leakage from the receptacle can occur that necessitates cleaning of the blender system, which may be more difficult in an automated system. Another challenge is cleaning of the blender receptacle, particularly where blending food since in this situation the blender receptacle may need to be cleaned between each recipe. Another challenge is the minimize the movement of the lid to minimize the drips from either the food being blended or the water used for cleaning. Another challenge is to provide the cleaning water within the minimized drip lid movement.

The present disclosure introduces an automated blender that may be used to blend ingredients and to clean blender receptacles without leakage, and while ensuring adequate cleaning of the blender receptacles.

BRIEF DESCRIPTION OF THE DRAWINGS

FIG. 4 is a first side view of the automated lid blender system of FIG. 1 illustrating a process of opening the blender lid according to one embodiment;

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

The present disclosure relates to apparatuses, systems, and methods of securely placing a blender lid on a blender receptacle to prevent or reduce leaks during blending of ingredients and/or cleaning of the blender receptacle, for example.

Figure 1:
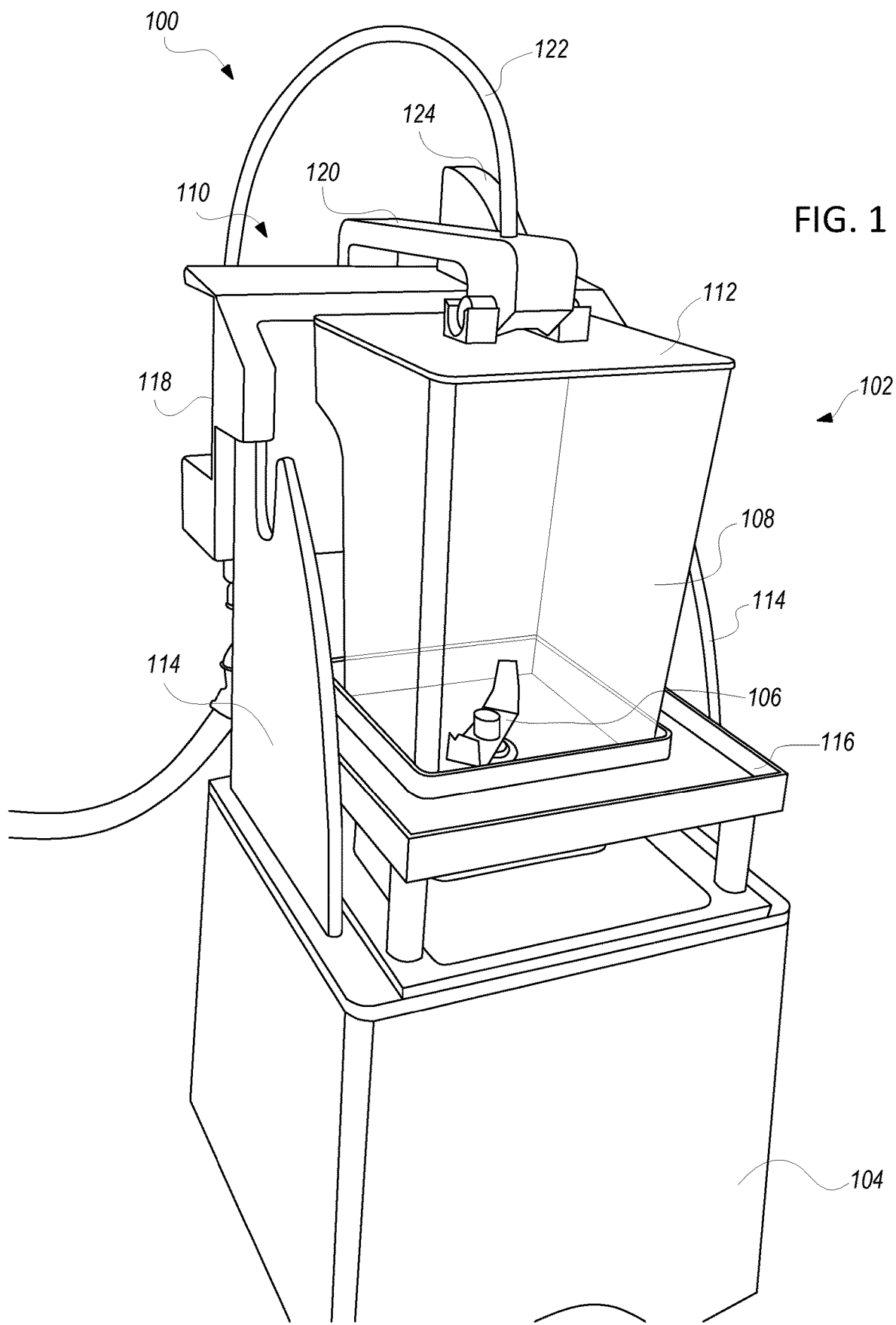
FIG. 1 is a perspective view of an automated lid blender system according to one embodiment.

FIG. 1 is a perspective view of an automated lid blender system 100 according to one embodiment of the present disclosure. The automated lid blender system 100 includes a blender 102 having a base 104 including a motor (not shown) that is controllable to drive mixing blades 106 of a blender receptacle 108 in which ingredients to be blended are placed. The blender receptacle 108 may be removably engaged with the base 104 and is shown engaged with the base during which the motor of the base may drive the mixing blades 106 of the blender receptacle. The automated lid blender system 100 includes an automated lid control mechanism 110 that controls the opening and closing of a blender lid 112 to selectively cover and uncover an opening in the blender receptacle 108. The lid control mechanism 110 is attached to an enclosure 114 that rests on and is attached to the base 104 and includes vertical sidewalls surrounding the blender receptacle 108 when the receptacle is engaged with the base, as shown in FIG. 1. The enclosure 114 also includes a drip guard 116 having an opening through which the blender receptacle 108 is placed when engaged with the base 104. The drip guard 116 collects drips of liquid contained in the blender receptacle 108 that may escape from the receptacle and prevents such drips from reaching the top of the base 104, which would be more difficult to clean than cleaning the drip guard 116.

The automated lid control mechanism 110 includes a base 118 that is attached at tops of the vertical sidewalls of the enclosure 114 and a lid arm 120 coupled at one end to the blender lid 112. The base 118 includes electronic components (not shown) that control the operation of the lid arm 120 and other components (not shown) for controlling the dispensing of water into the blender receptacle 108 through a flexible water tube 122 during cleaning of the receptacle. The lid arm 120 is coupled rotationally about a first horizontal axis (not shown) and is controlled to rotate about the first horizontal axis to selectively position the blender lid 112 to cover and uncover an opening in the blender receptacle 108. The automated lid control mechanism 110 also includes a lid support guide 124 that engages the blender lid 112 to orient the blender lid upward to reduce dripping of ingredients from a lower surface of the blender lid after removal of the blender lid from the blender receptacle 108. The operation of the automated lid control mechanism 110 will be described in more detail below. The blender lid 112 is designed with tolerances to secure it in a leakproof manner in spite of variations in positioning the receptacle 108.

Figure 2:
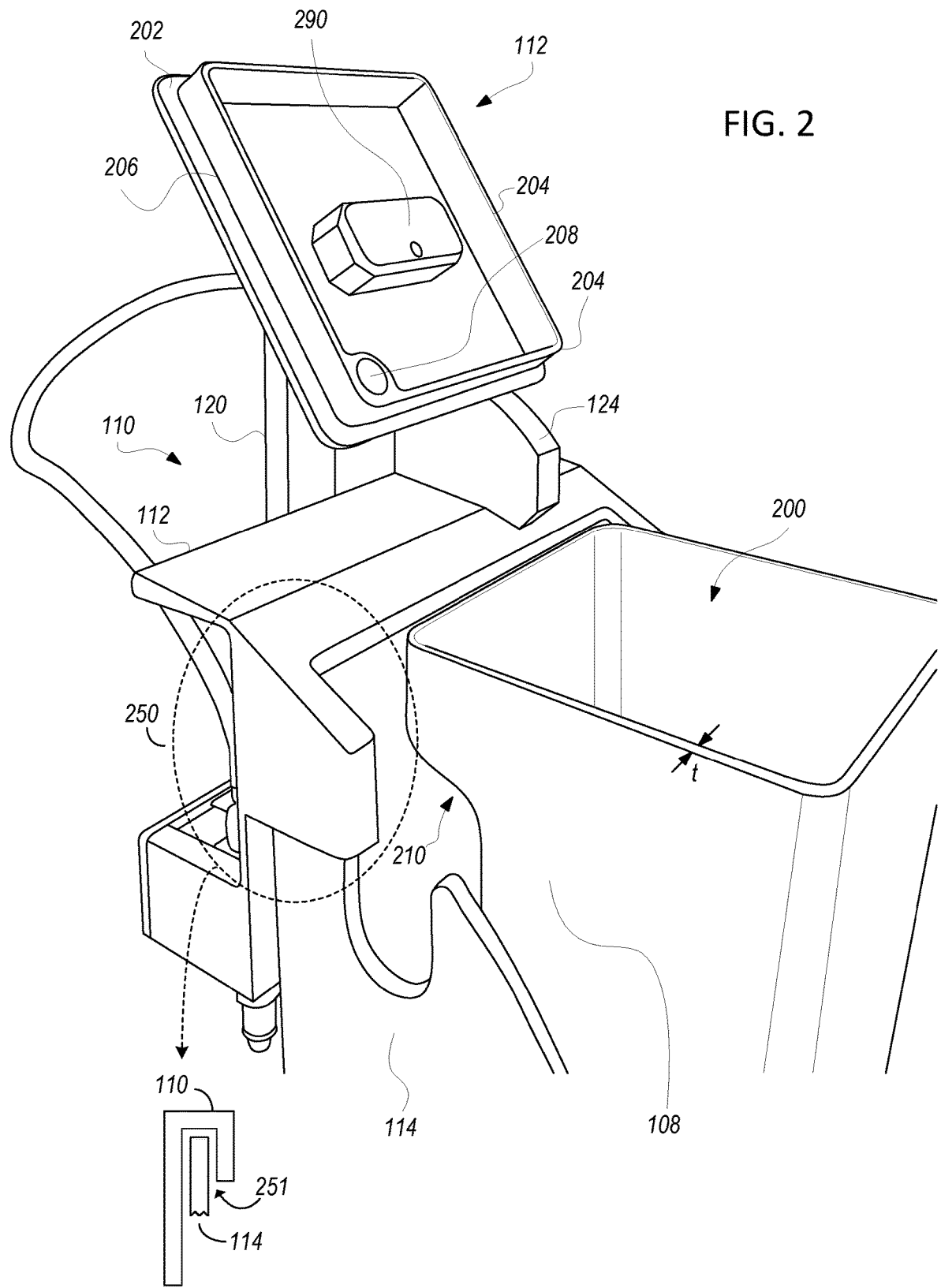
FIG. 2 is a perspective view of a portion of the automated lid blender system of FIG. 1 with the automated lid in an open position according to an embodiment.

FIG. 2 is a perspective view of a portion of the automated lid blender system 100 of FIG. 1 with the automated lid 112 opened or in an open position. An opening 200 in the top of the blender receptacle 108 is illustrated in FIG. 2. The blender lid 112 includes a horizontal top 202 configured to cover the opening 200 in the receptacle 108 upon placement of the blender lid onto the blender receptacle. As seen in FIG. 2, the blender receptacle 108 includes sidewalls having a thickness t. The horizontal top 202 is sized such that when the blender lid 112 is closed the horizontal top 202 covers the entire opening 200 and also extends onto or over the thickness t of each of the sidewalls of the blender receptacle 108. This enables the horizontal top 202 to engage with the tops of the sidewalls of the blender receptacle 108 and thereby form a seal with the sidewalls to prevent ingredients being blended in the blender receptacle from leaking outside the blender receptacle during blending. In this way, the blender lid 112 and more specifically the horizontal top 202 of the blender lid seals the blender receptacle 108, as will be described in more detail below.

The blender lid 112 further includes a vertical lid wall 204 attached to a lower surface of the horizontal top 202. The vertical lid wall 204 extends from a lower surface of the horizontal top 202, and thus extends into the opening 200 of the blender receptacle 108 upon placement of the blender lid onto the blender receptacle. The vertical wall 204 has rounded corners as seen and helps guide the blender lid 112 into the opening 200 as the lid arm lowers the blender lid onto the receptacle. In addition, the vertical wall 204 also helps contain ingredients that have collected on the lid 112 within the vertical wall so that such ingredients do not drip off the lid when the opened. The blender lid 112 along with the horizontal top 202 and vertical wall 204 generally have the shape of the opening 200 of the blender receptacle. Thus, in the example of FIG. 2 the opening 200 is square and so an outer edge of each of the horizontal top 202 and vertical wall 204 are also each square. As seen in FIG. 2, a length of each side of the vertical wall 204 is smaller than a length of each side of the horizontal top 202 such that there is an outer lip 206 around the outer edges of the horizontal top between these outer edges and the vertical wall 204. This outer lip 206 has a thickness that at least partially covers the sidewalls of the blender receptacle 108, and may have a thickness greater than the thickness t of the sidewalls of the blender receptacle such that the outer lip 206 extends over outer edges of the sidewalls of the blender receptacle.

The blender lid 112 further includes a pressure release vent 208 formed in the horizontal top 202 to release pressure formed in the blender receptacle 108 during blending of ingredients in the blender receptacle, and during cleaning of the blender receptacle, which may be performed using hot water with a temperature above 160 deg F, for example. As seen in FIG. 2, the vent 208 is positioned in a lower left-hand corner of the horizontal top 202 in this embodiment. In general, the vent 208 is positioned on the horizontal top 202 in a location that reduces the likelihood that liquid will be released through the vent during blending and cleaning in the blender receptacle 108. In the embodiment of FIG. 2, the vent 208 is positioned as shown because the blender receptacle 108 includes a cutout 210 in a corner that receives the corner of the blender lid 112 including the vent 208 when the blender lid is placed over the opening 200 of the receptacle 108. In this example, the vent 208 is vertically above the cutout 210 and may not be directly above the ingredients being blended in the blender receptacle 108, thus making it less likely that any ingredients that are projected upward towards the blender lid 112 will enter the vent. Blender lid 112 may further include an inlet 290 (e.g., aka an aperture or opening in the lid for inserting a cleaning fluid into blender receptacle 108). In this example, inlet 290 is positioned approximately at a center location of the blender lid 112 and receptacle opening 200. Inlet 290 may be configured through a structure positioned at a center of lid 112 and having a thickness greater than the thickness of the horizontal top 202 so that a liquid flow tube may be inserted and held inside inlet 290, for example. In this example, the structure including the inlet forms a rectangular island inside the bottom of lid 112 as shown.

FIGS. 1 and 2 illustrates another feature that may be included in some example embodiments. In this example, automated lid control mechanism 110 may be detachable from the blender components of the system, such as base 104 and enclosure 114. In this example, automated lid control mechanism 110 is detachably coupled to the vertical sidewalls of enclosure 114. The lid control mechanism 110 may include a vertical grove 251 for receiving the upper edge of the sidewalls of enclosure 114 so that the entire lid control mechanism 110 may engage and rest on the upper edges of the sidewalls as illustrated at callout 250, for example. Accordingly, a variety of blender systems may be used, and automation of the blender function as described herein may be achieved by adding the automated lid control mechanism 110, for example.

Figure 3:
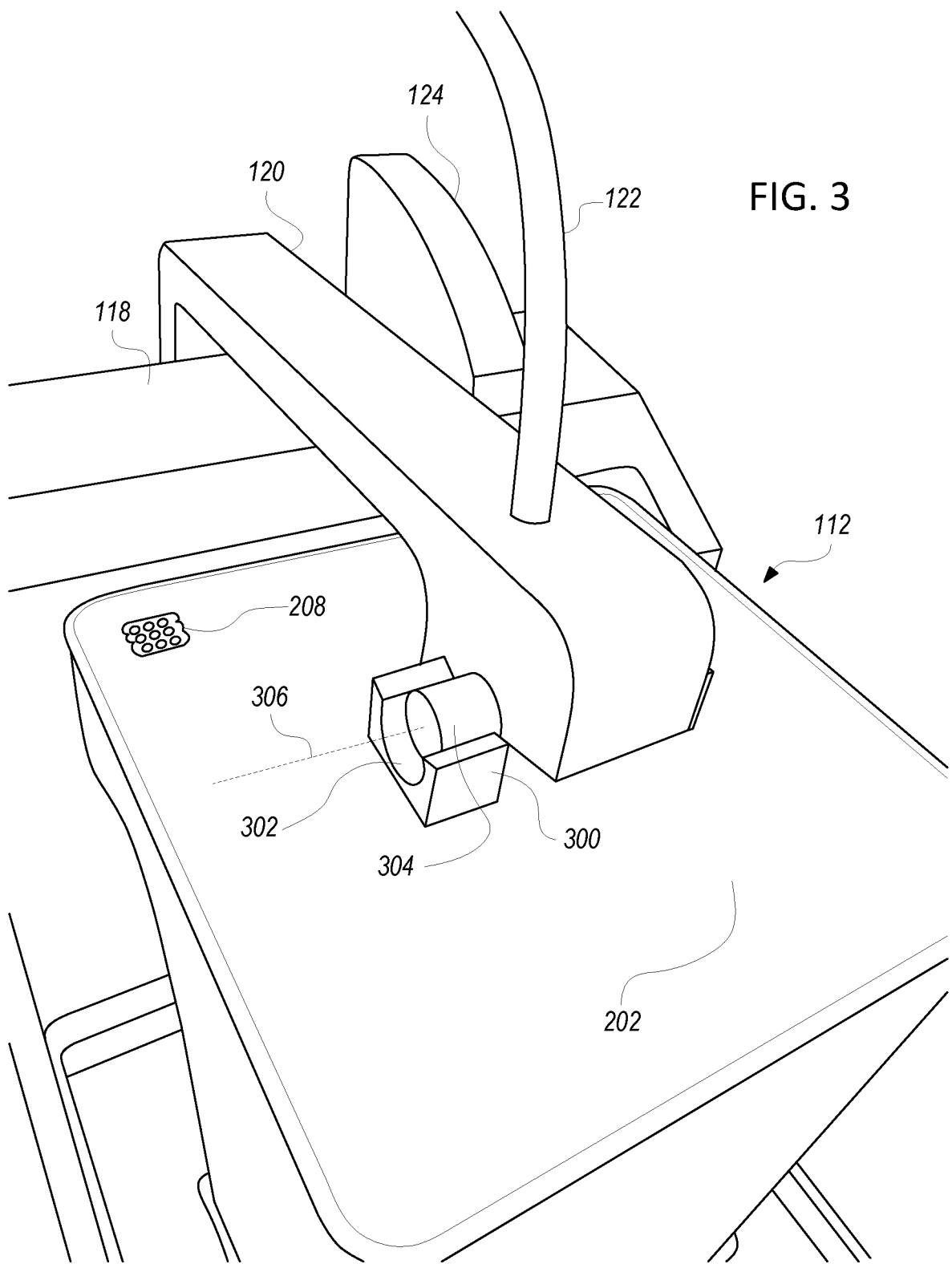
FIG. 3 is a more detailed view of the top of the blender lid of FIG. 1 in place on the blender receptacle according to an embodiment.

FIG. 3 is a more detailed view of the attachment of the lid arm 120 to the blender lid 112 of FIG. 1 according to an embodiment. As shown in FIG. 3, the horizontal top 202 of the blender lid 112 includes an attachment device 300 configured on a top surface of the horizontal top. The attachment device 300 includes a semicircular groove 302 configured to receive a cylindrical rod 304 on the lid arm 120 to rotatably attach the lid arm to the blender lid 112. In this embodiment, the lid arm 120 has a first end coupled rotationally about the first horizontal axis (not shown) and a second end coupled to the blender lid 112 rotationally about a second horizontal axis 306, where the second horizontal axis is parallel to the first horizontal axis, as will be described in more detail below. In this example, the lid arm 120 may be include an approximately right angle as illustrated below, for example. In the embodiment of FIG. 3, a flexible water tube 122 extends through an opening in the lid arm 120 and then through a corresponding opening or aperture (e.g., inlet 290) in the horizontal top 202 of the lid 112 so that a cleaning fluid (e.g., water) may be supplied through the tube and into the blender receptacle 108 during cleaning of the blender receptacle. In some embodiments, there is flexibility built into the engagement between 302 and 304 to accommodate for the variations in receptacle engagement but still ensuring a leak proof covering the lid.

Figure 4B:
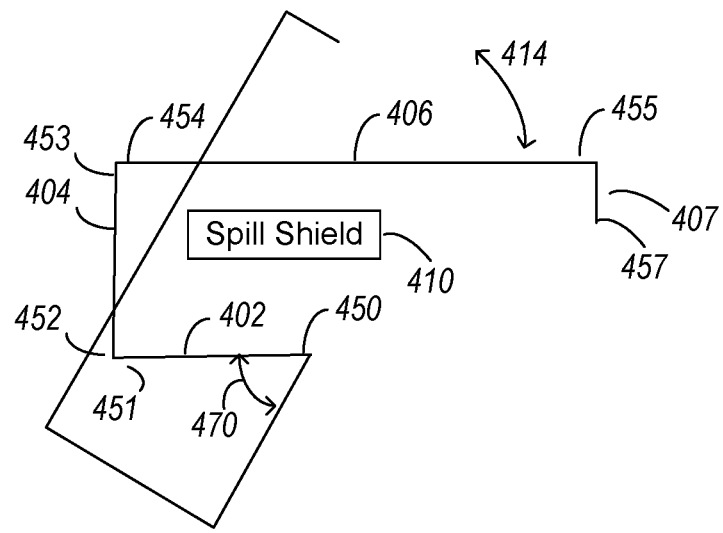
FIG. 4B is a side view of a lid arm according to one embodiment.
Figure 4C:
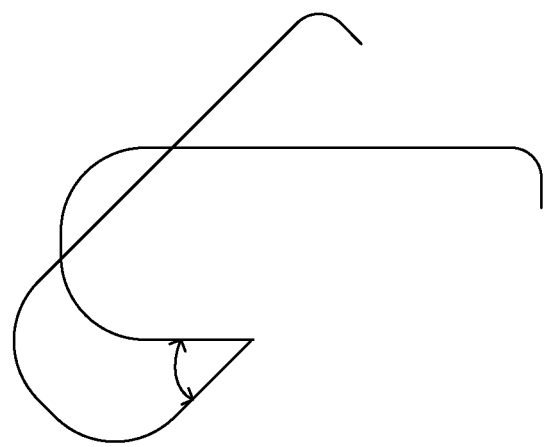
FIG. 4C is a side view of a lid arm according to one embodiment.
Figure 5:
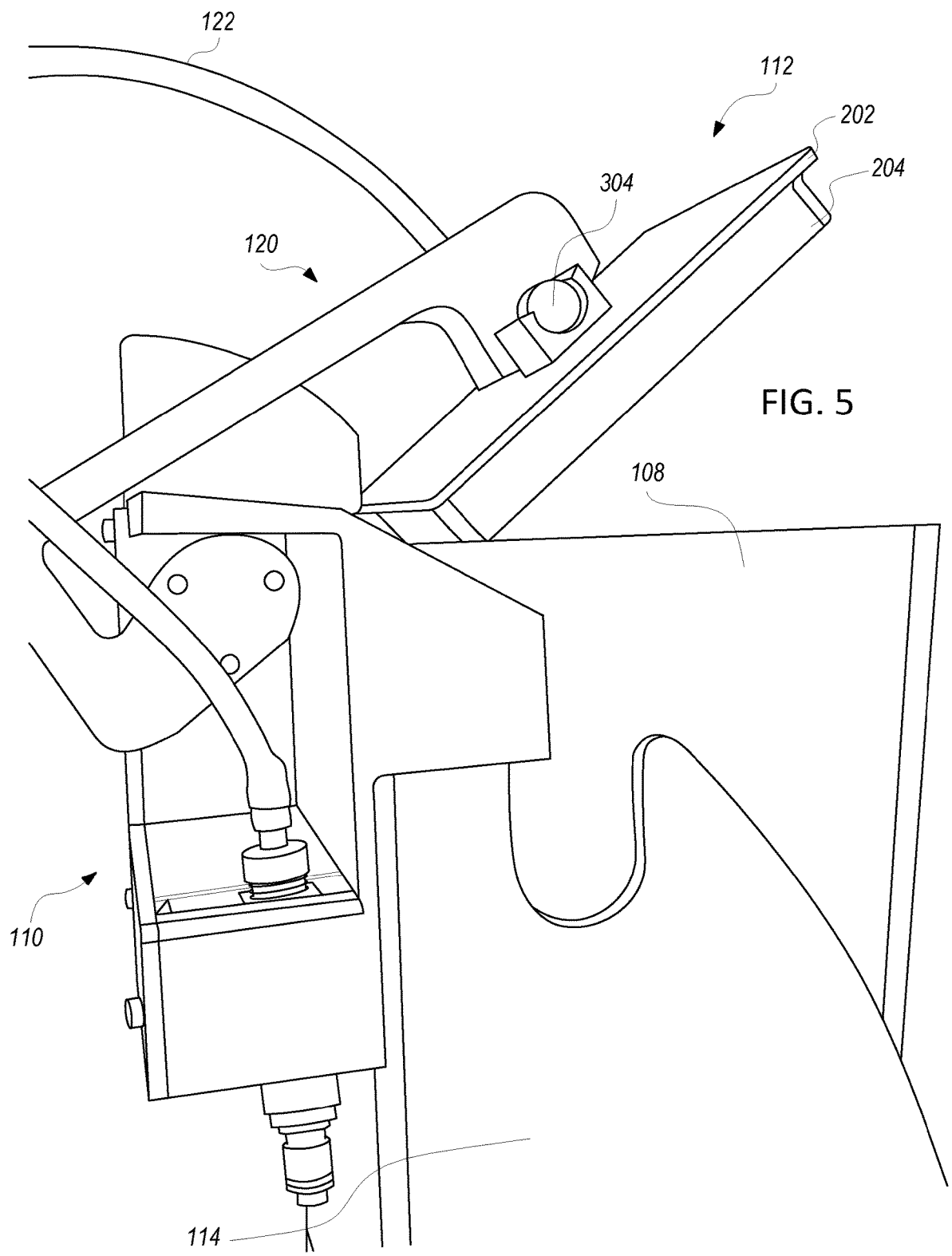
FIG. 5 is a side view of the automated lid blender system of FIG. 1 according to one embodiment.
Figure 6:
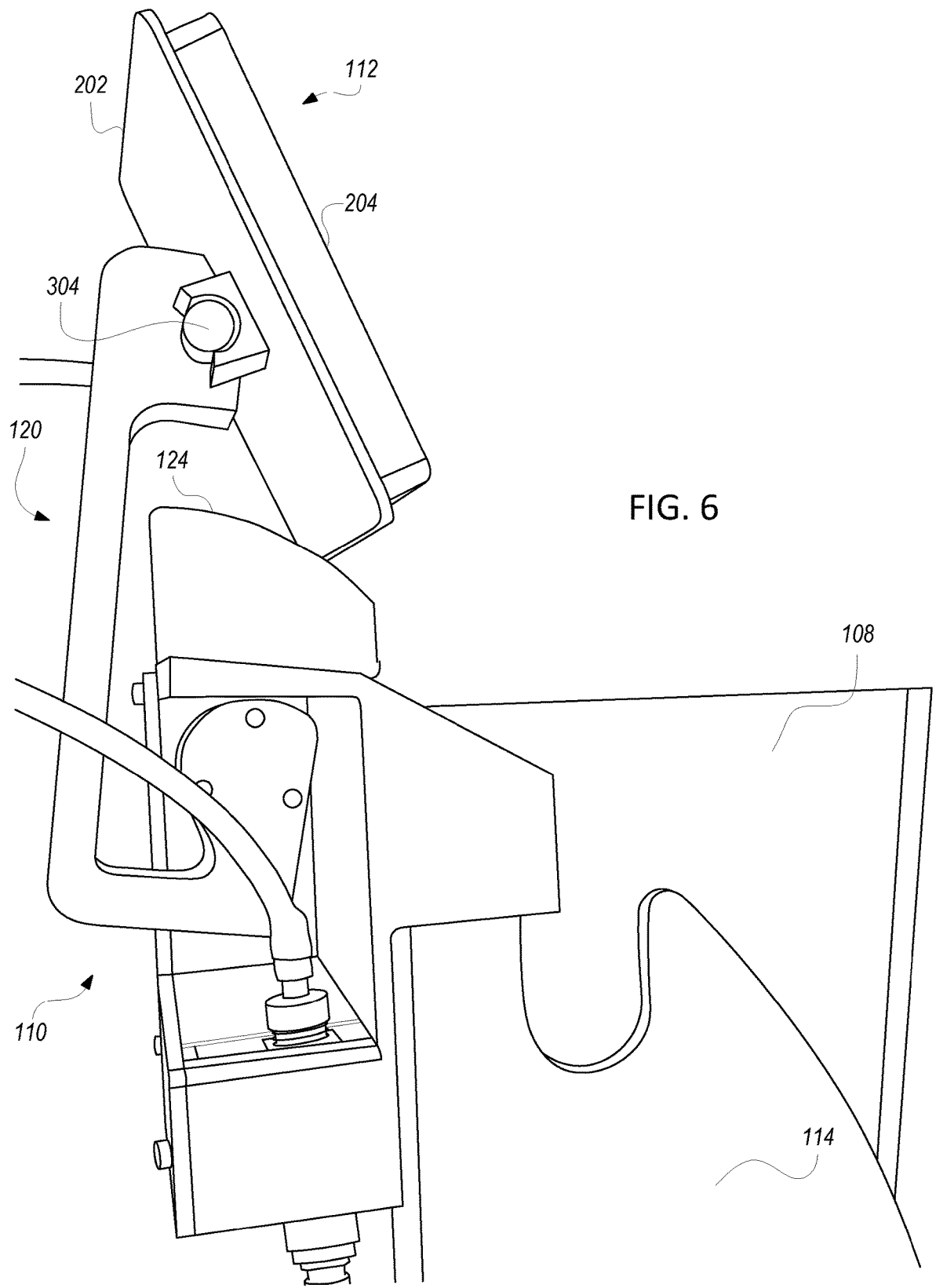
FIG. 6 is a side view of the automated lid blender system of FIG. 1 according to one embodiment.

FIGS. 4-6 are side views of the automated lid blender system 100 of FIG. 1 illustrating a process of opening the blender lid 112 according to one embodiment. The FIGS. 4-6 also show, in more detail, one embodiment of the lid arm 120 and one embodiment of the automatic lid control mechanism 110 of FIG. 1. Before describing the opening process illustrated in FIGS. 4-6, the details of the lid arm 120 and the automatic lid control mechanism 110 illustrated will first be described. Referring to FIGS. 4 and 4B, the lid arm 120 comprises an extended U-shape (e.g., a fish hook structure), which rotates about the first horizontal axis 400 (axis 400 extends into and out of (or perpendicular to) the page in the embodiment of FIGS. 4 and 4B-C). The lid arm 120 includes a first radial element 402 extending radially from the first horizontal axis 400. Referring to FIG. 4B, the first radial element 402 has a first end 450 configured to rotate about the first horizontal axis 400 and a second end 451 opposite the first end. A second element 404 of lid arm 120 includes a first end 452 coupled to the second end 451 of the radial segment 402 (e.g., at approximately a right angle). Thus, the second element 404 extends approximately orthogonally from the first radial element 402, and the second element 404 includes a second end 453 opposite the first end 452 of the second element. A third element 406 of lid arm 120 includes a first end 454 coupled to the second end 453 of the second element 404, with the third element 406 extending approximately orthogonal to the second element 404 and the third element including a second end 455 opposite the first end 454 of the third element. The second end 455 of the third element 406 may be coupled rotationally to the blender lid 112 about a second horizontal axis 306 (FIG. 3) that is parallel to the first horizontal axis. In one example embodiment, the lid arm 120 may include a fourth element 407 extending approximately orthogonal to the third element 406 and toward the first radial element 402, where blender lid 112 is coupled rotationally to a distal end 457 of element 407 to ensure that lid 112 securely engages the top of blender receptacle 108, for example. In other embodiments, attachment device 300 may extend up to the third element 406 of lid arm 120. While the above elements 402, 404, 406, and 407 of lid arm 120 have been illustrated in FIGS. 4 and 4B as substantially linear (or straight) elements, it is to be understood that one or more of such elements may be curved as illustrated in FIG. 4C and formed on one continuous piece of material, for example.

Referring again to FIG. 4, the control mechanism 110 includes the base 118 having attachment projections 408, one of which is shown in FIG. 4, to attach the base to the enclosure 114. The base 118 further includes a spill shield 410, which may be relatively easily cleaned, extending away from the attachment projections 408 that functions to prevent or reduce the likelihood that any drips of ingredients from the lid 112 will impact on other components. Without the spill shield 410 drips of ingredients from the lid 112 could drop onto lower portions of the base 118 of the lid control mechanism 110, which would more difficult to clean the if such drips are collected on the spill shield. As illustrated in FIG. 4B, the lid arm 120 is configured to rotate around the spill shield 410.

As previously mentioned, the base 118 of the lid control mechanism 110 includes electronic components (not shown), such as a motor, that control the rotation of the lid arm 120 about the first horizontal axis 400. The base 118 further includes components (not shown) for controlling the dispensing of water into the blender receptacle 108 through the flexible water tube 122 during cleaning of the receptacle 108. FIG. 4 illustrates a water inlet 410 attached to the flexible water tube 122, with components such as a valve (not shown) in the base 118 to control the flow of water through the flexible water tube.

The operation of the process of opening the blender lid 112 illustrated in FIGS. 4-6 will now be described in more detail. In FIG. 4, the blender lid 112 is shown in position on the blender receptacle 108 to seal the blender receptacle and prevent the leakage of ingredients being blended in the blender receptacle. In this position of the blender lid 112, a motor or other suitable device coupled to the lid arm 120 rotates the lid arm 120 across a range of angles (e.g., 470 in FIG. 4B) about the first horizontal axis 400, as indicated by arrow 414, to cover the opening in the blender receptacle 108 and to apply a downward force F on the blender lid to seal the opening of the blender receptacle with the blender lid. In one embodiment, the lid arm 120 is made with a tolerance fit that allows three-dimensional movement of the blender lid 112 relative to the blender receptacle 108. This three-dimensional movement of the blender lid 112 enables the blender lid 112 and the lid arm 120 to move in three-dimensions responsive to the downward force F and seal the opening of the blender receptacle to prevent or reduce leakage of liquids in the blender receptacle through the opening during blending or cleaning in the blender receptacle. For example, the blender lid 112 may not be properly aligned with the opening of the blender receptacle as the lid arm 120 rotates clockwise about the first horizontal axis 400, the flexibility of the lid arm 120 and lid 112 relative to each other enables the blender lid to be properly secured within the opening. The downward force F applied by the lid arm 120 to the blender lid 112 forms a seal between the outer lip 206 (FIG. 2) of the lid and the upper edges of thickness t of the sidewalls (FIG. 2) of the blender receptacle 108.

Referring now to FIG. 5, after a blending cycle has been executed to blend ingredients in the blender receptacle 108 and the cycle has been terminated, the motor or other suitable device coupled to the lid arm 120 is controlled to reverse the rotation of the lid arm about the first horizontal axis 400 to partially open the blender lid 112 as shown. The blender lid 112 is held in this partially open position illustrated in FIG. 5 for a partial-open delay time. This partial-open position is configured to allow some of the blended ingredients present on the lower surface of the blender lid 112 from the prior blending cycle to drip off the blender lid and back into the blender receptacle 108. During most any blending cycle at least some of the ingredients being blended will splash up and onto the lower surface of the blender lid 112. As a result, if the lid arm 120 were immediately rotated to the fully open position after a blending cycle, some of the blended ingredients that have splashed onto the lower surface of the blender lid 112 could undesirably drip down onto components outside the blender receptacle 108, causing the need to more frequently clean such components.

After the partial-open delay time has elapsed, the motor or other suitable device coupled to the lid arm 120 is controlled to again rotate the lid arm about the first horizontal axis 400 to open the blender lid 112 to the fully open position as shown in FIG. 6. In the fully open position, the lower edge of the horizontal top 202 of the blender lid 112 rests on the lid support guide 124 which, in turn, ensures that the lower surface of the blender lid 112 is directed upward as the blender lid engages the lid support guide and proceeds along this guide to the fully open position. As previously mentioned, orienting the blender lid 112 in this way with the lower surface oriented upward prevents or reduces dripping of blended ingredients present on the lower surface of the blender lid. Also due to the firm resting position of 112 on 124, and the angle of resting, the liquid will accumulate on the inner wall of 204, height of 204 is designed as such and the liquid gets subsequently cleaned during the clean cycle.

Figure 7:
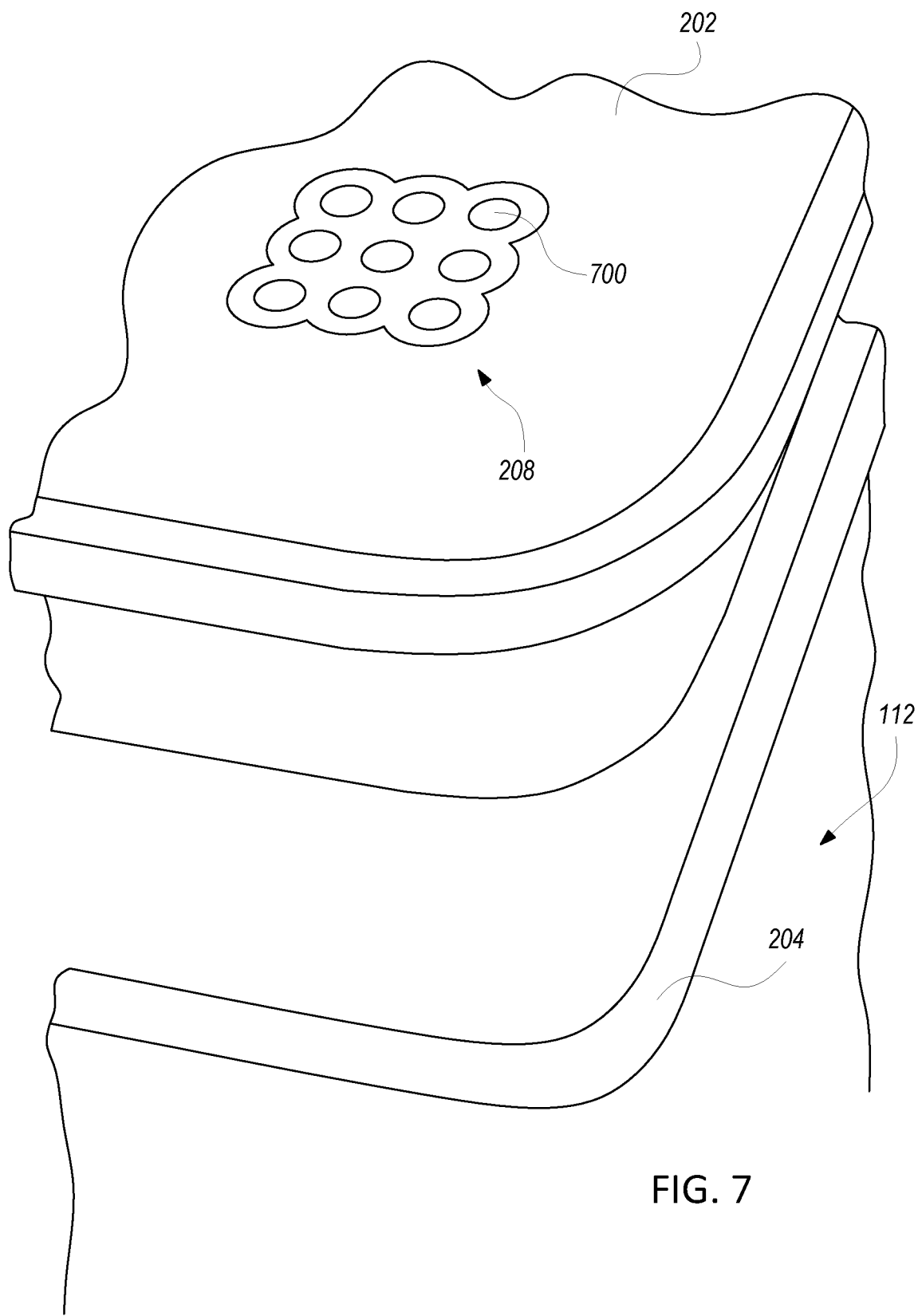
FIG. 7 is an enlarged perspective view illustrating a top view of a pressure release vent in the blender lid of FIGS. 1 and 2 according to one embodiment.
Figure 8:
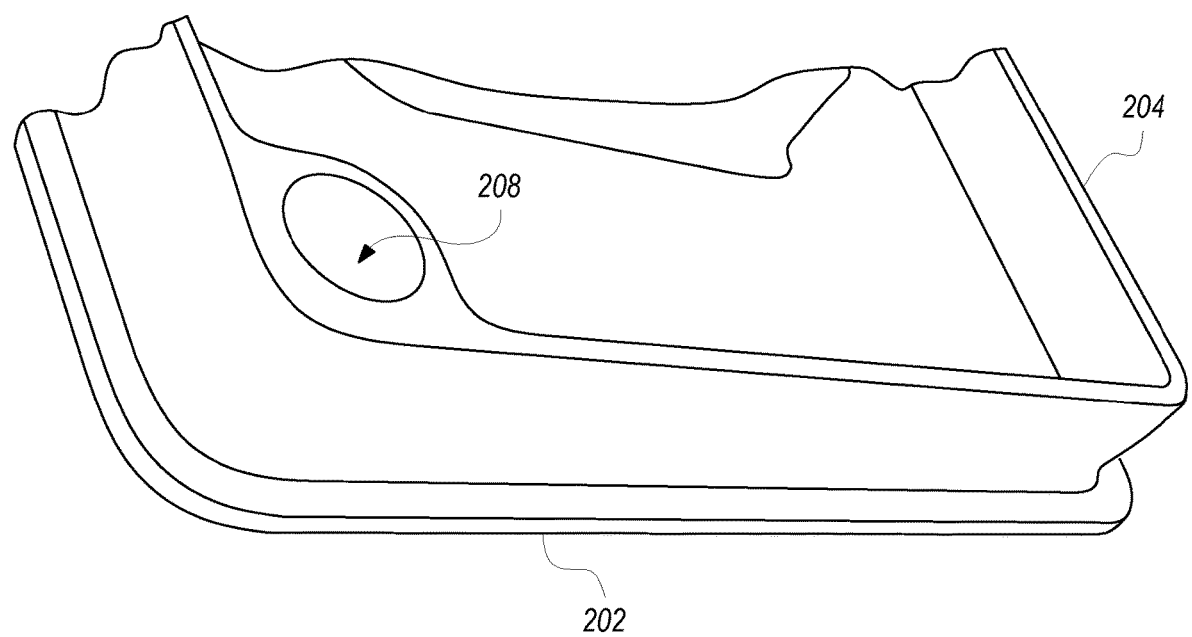
FIG. 8 is an enlarged perspective view illustrating a bottom view of the pressure release vent of FIG. 7 according to one embodiment.

FIG. 7 is an enlarged perspective view illustrating a top view of the pressure release vent 208 in the blender lid 112 of FIGS. 1 and 2 according to one embodiment. In this embodiment, the pressure release vent 208 includes a plurality of small holes 700 on the upper surface of the horizontal top 202 of the blender lid 112. FIG. 8 is an enlarged perspective view illustrating a bottom view of the pressure release vent 208 of FIGS. 2 and 7 according to one embodiment. As previously described, the pressure release vent 208 may be oriented in a corner of the lid 112 above the cut out 210 (FIG. 2) present in the blender receptacle 108 to reduce ingredients being blended in the blender receptacle 108 from entering the vent, for example.

Figure 9:
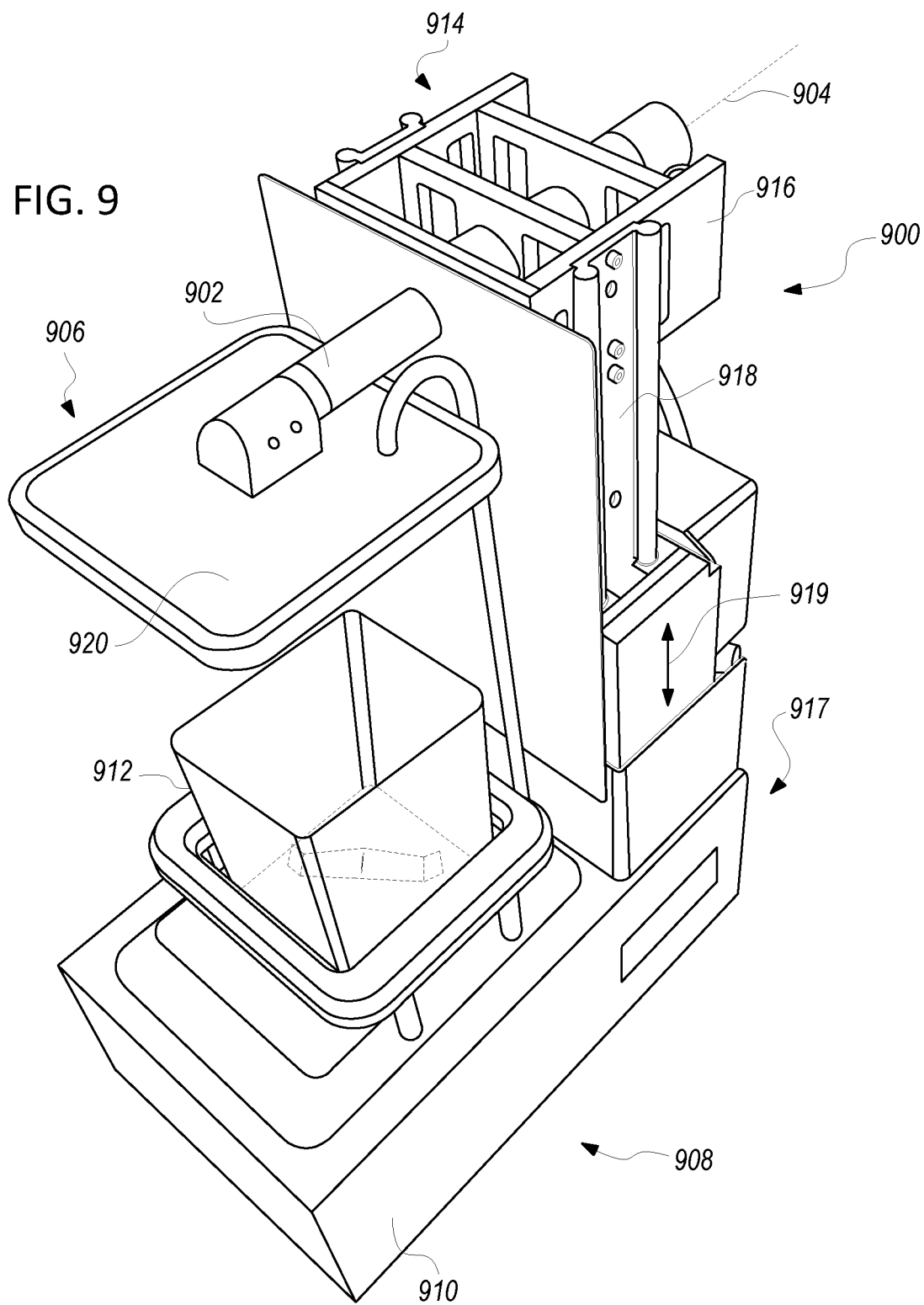
FIG. 9 is a perspective view of an automated lid blender system according to another embodiment.

FIG. 9 is a perspective view of an automated lid blender system 900 according to another embodiment. In this example automated lid blender system 900, a lid arm 902 is formed by a horizontal rod having a longitudinal axis corresponding to a first horizontal axis 904. The horizontal rod 902 has a first end attached to a blender lid 906. A motor or other suitable device is attached to a second end of the horizontal rod 902 opposite the first end and is controlled to rotate the blender lid 906 about the first horizontal axis 904. The automated lid blender system 900 includes a blender 908 having a base 910 including a motor (not shown) that is controllable to drive mixing blades (not shown) of a blender receptacle 912 in which ingredients to be blended are placed. The blender receptacle 912 may be removably engaged with the base 910 and is shown engaged with the base during which the motor of the base may drive the mixing blades of the blender receptacle.

The automated lid blender system 900 further includes an automated lid control mechanism 914 that controls the opening and closing of the blender lid 906 to selectively cover and uncover an opening in the blender receptacle 912. The lid control mechanism 914 includes a housing 916 including a motor (not shown) that is attached to the second end of the horizontal rod 902 to rotate the horizontal rod about the first horizontal axis 904. The lid control mechanism 914 further includes a vertical control assembly 917 below the housing 916 that is attached to the housing through vertical height adjustment members 918, one of which is shown in FIG. 9. The vertical control assembly 917 controls a vertical position or height of the housing 916 as illustrated by the arrows 919 to thereby control the vertical position or height of the horizontal rod 902 and blender lid 906. In this embodiment, the blender lid 906 rotates 180 degrees about the first horizontal axis 904 between an open position and a closed position. The vertical control assembly 917 also controls the vertical position or height of the blender lid 906 to selectively cover or uncover an opening of the blender receptacle 912 with the blender lid, as will be described in more detail below.

Figure 10:
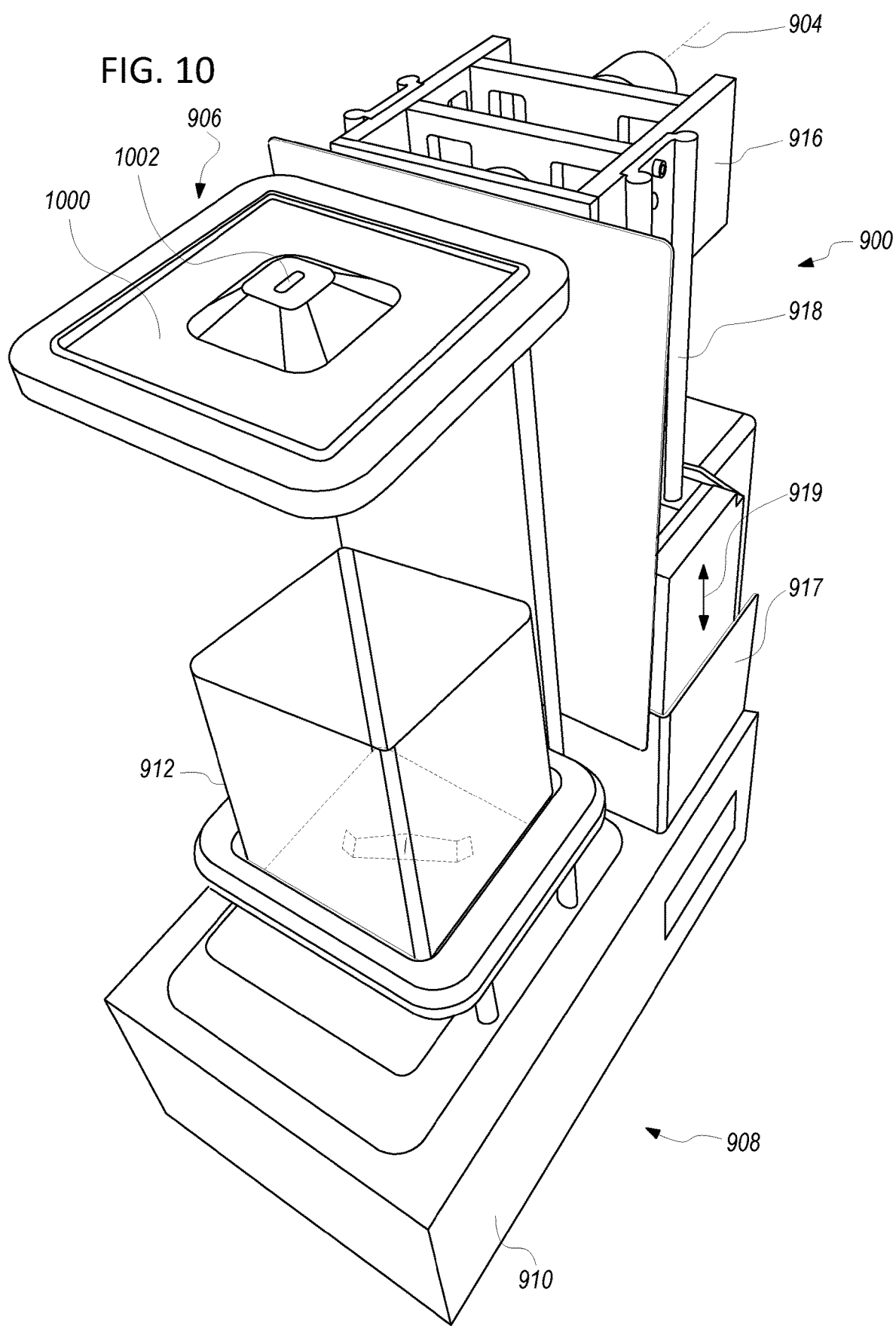
FIG. 10 is a perspective view of the automated lid blender system of FIG. 9 with the blender lid rotated one hundred and eighty degrees according to one embodiment.
Figure 11:
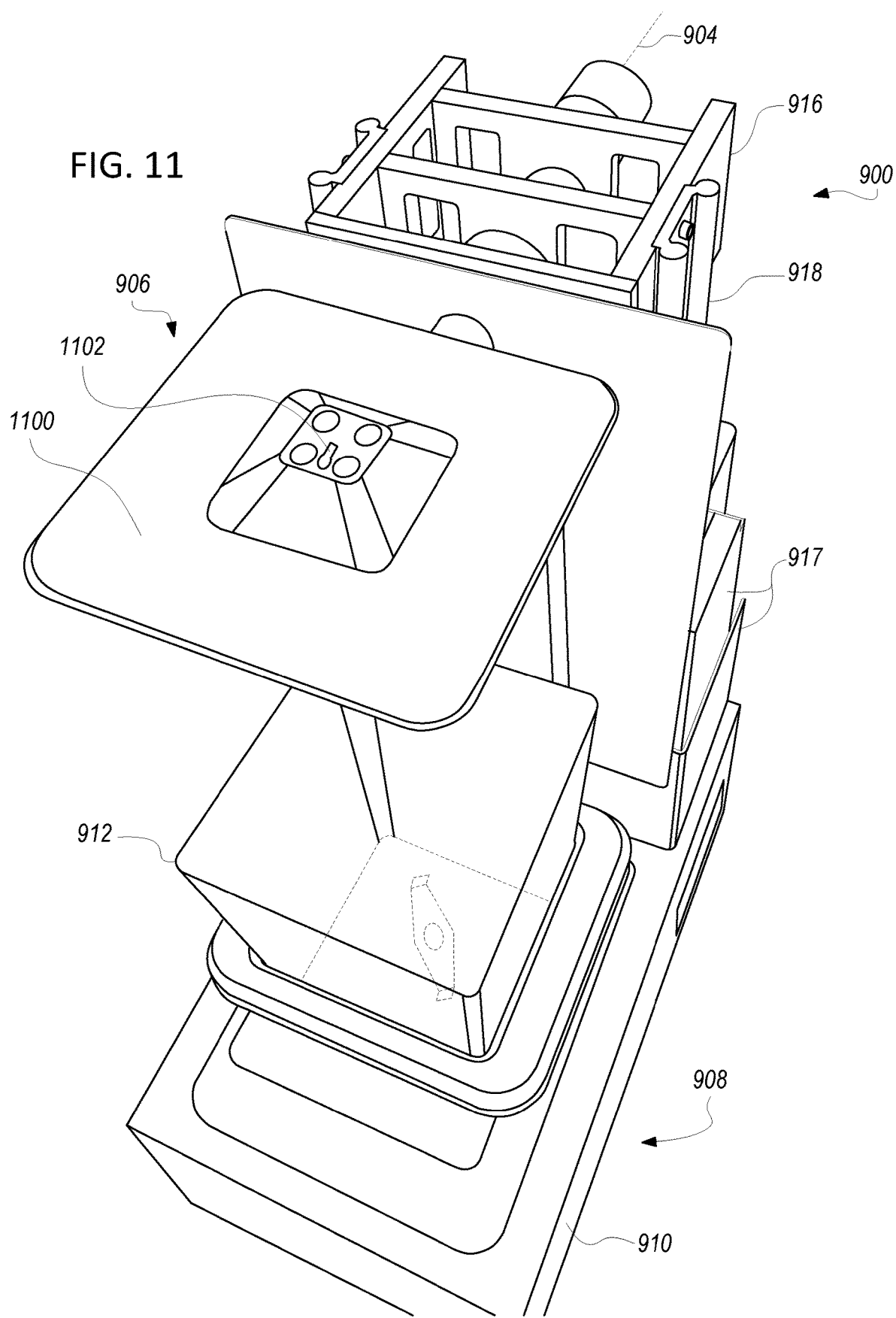
FIG. 11 is a perspective view of the automated lid blender system of FIG. 9 with a flexible lid cover removed according to one embodiment.

FIG. 10 illustrates the automated lid blender system 900 with the blender lid 906 rotated 180° about the first horizontal axis 904. The blender lid 906 has an upper surface 920 and an opposing lower surface. In FIG. 10, a silicon seal 1000 covers the lower surface of the blender lid 906. This silicon seal 1000 includes a pressure release vent 1002 in the center of the silicon seal. FIG. 11 is a perspective view of the automated lid blender system 900 of FIGS. 9 and 10 with the blender lid 906 in the same position as in FIG. 10 except with the silicon seal 1000 removed. As seen in FIG. 11, the blender lid 906 includes a pressure release vent 1102. The pressure release vent 1002 in the center of the silicon seal 1000 in combination with pressure release vent 1102 in the blender lid 906 function to release pressure formed in the blender receptacle 912 during blending of ingredients in the blender receptacle, and during cleaning of the blender receptacle. In one embodiment, the pressure release vent 1102 is an L-shaped vent in the center portion of the blender lid 906 to prevent blended ingredients from being forced through the vent 1102 and vent 1002 during blending of ingredients in the blender receptacle 912.

Figure 12:
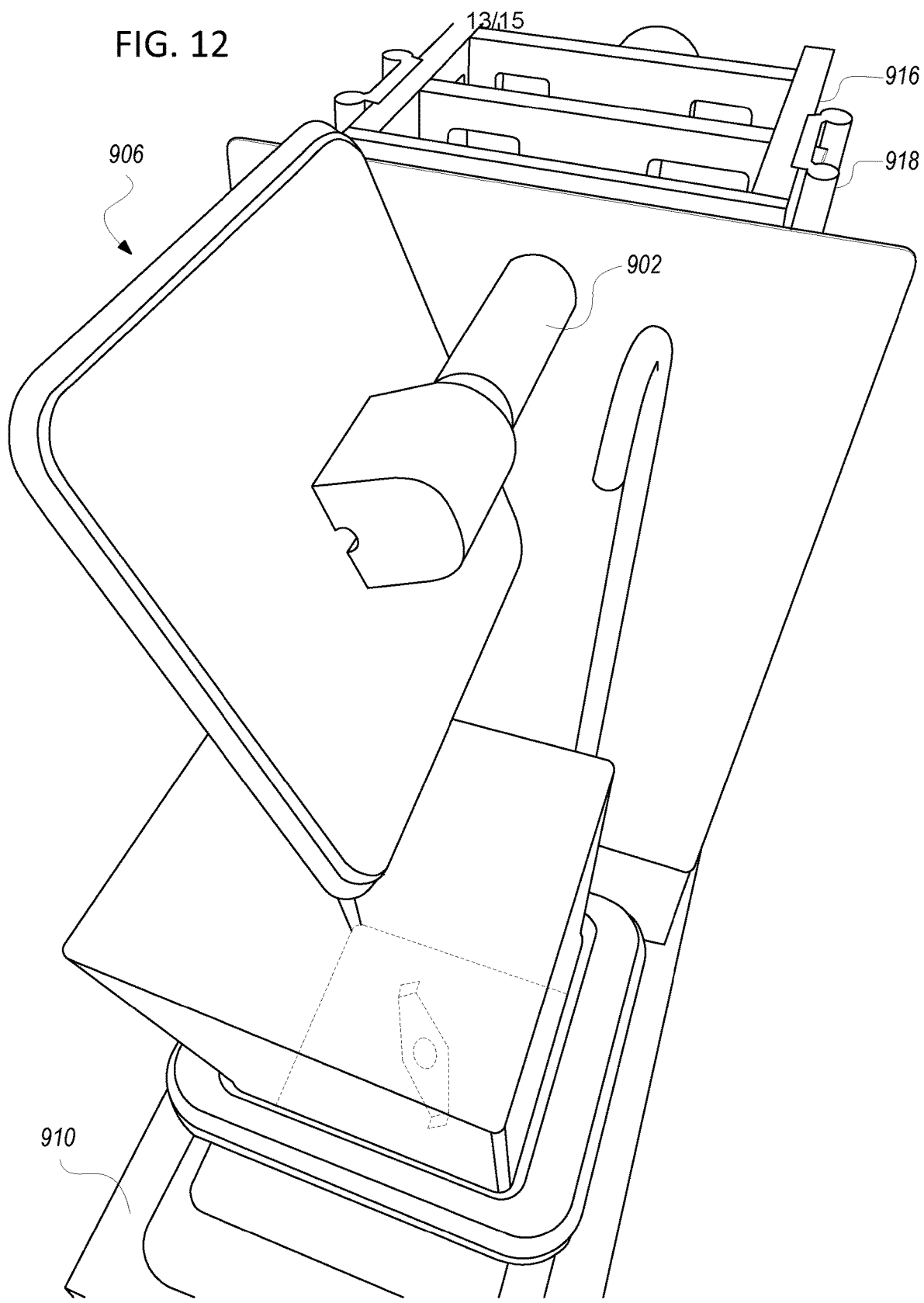
FIG. 12 is a perspective view of the automated lid blender system of FIG. 9 illustrating the blender lid during rotation at a point between the position of the blender lid in the views of FIGS. 9 and 10 according to one embodiment.

FIG. 12 is a perspective view of the automated lid blender system 900 of FIG. 9 illustrating the blender lid 906 during rotation and at a point between the position of the blender lid in the view of FIG. 9, which is in the closed orientation, and the position of the blender lid in the view of FIG. 10, which is in the open orientation.

The operation of the automated lid blender system 900 will now be described in more detail with reference to FIGS. 9-12. Initially, the vertical control assembly 917 raises the height of the blender lid 906 to a maximum height with the blender lid located in the uncovered position as shown in FIG. 10. The blender receptacle 912 is then placed on the blender base 910 and the blender lid 906 is rotated 180 degrees about the first horizontal axis 904 to the covered position of FIG. 9. At this point, the vertical control assembly 917 then lowers the housing 916 through the vertical height adjustment members 980. As the housing 916 lowers so does the blender lid 906 until the silicon seal 1000 on the blender lid engages with and seals the opening of the blender receptacle 912.

A blending cycle is then executed to mix ingredients in the blender receptacle 912. After this blending cycle is complete, the vertical control assembly 917 raises the height of the blender lid 906 to the maximum height to uncover or unseal the blender receptacle 912. The blender lid 906 is thereafter rotated 180 degrees about the first horizontal axis 904 to the uncovered position of FIG. 9, with the silicon seal 1000 oriented upward. Orienting the silicon seal 1000 upward prevent the dripping of ingredients that collect on the lower surface during the blending of ingredients in the blending receptacle 912. At this point, the blender receptacle 912 containing the blended ingredients in may be removed, such as by an arm of robot preparing a recipe with the blended ingredients.

Figure 13:
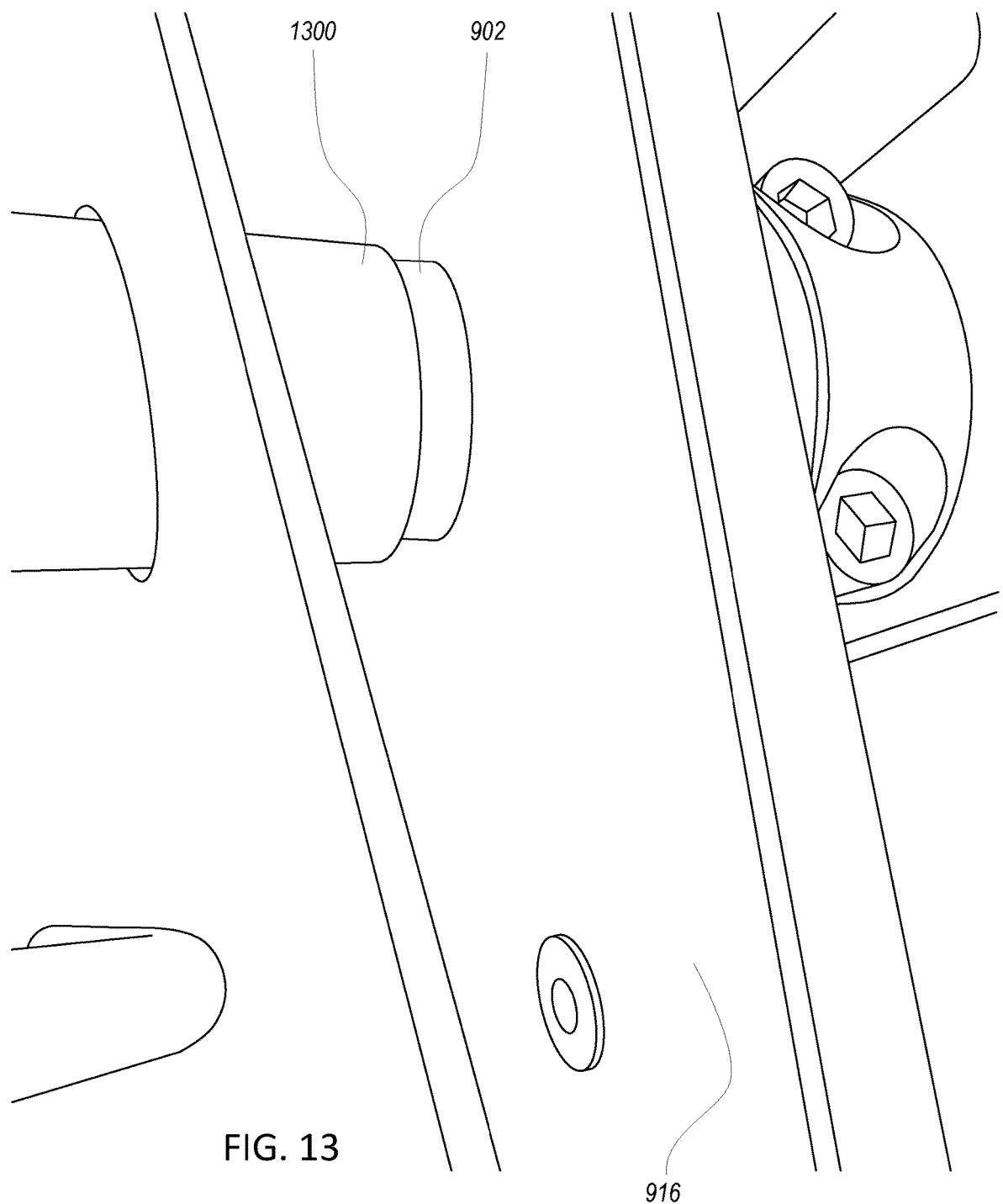
FIG. 13 is an enlarged view illustrating a flexible cover on the horizontal rod of the automated lid blender system of FIG. 9 to allow for planar engagement of the blender lid and an opening of a blender receptacle according to one embodiment.

FIG. 13 is an enlarged view illustrating a flexible cover 1300 on the horizontal rod of the automated lid blender system 900 of FIG. 9 to allow for planar engagement of the blender lid 906 and an opening of the blender receptacle 912 according to one embodiment. In the system 900, the horizontal rod 902 applies a downward force on the blender lid 906 when the vertical control assembly 917 lowers the housing 916 and to thereby engage the silicon seal 1000 with the opening of the blender receptacle 912 to seal the blender receptacle. The flexible cover 1300 on the horizontal rod 902 allows movement of the blender lid 906 relative to the blender receptacle 912 to enable the silicon seal 1000 of the blender lid to planarly engage with and seal the opening of the blender receptacle 912. Providing the horizontal rod 912 and the blender lid 906 with this movement capability or degrees of freedom allow the blender lid 902 to seal the blender receptacle 912 even when the blender lid is not perfectly planar to upper edges of the blender receptacle prior to engagement of the blender lid and blender receptacle as the vertical control assembly 917 lowers the housing 916 and to engage the silicon seal 1000 with the upper edges of the blender receptacle 912.

Figure 14:
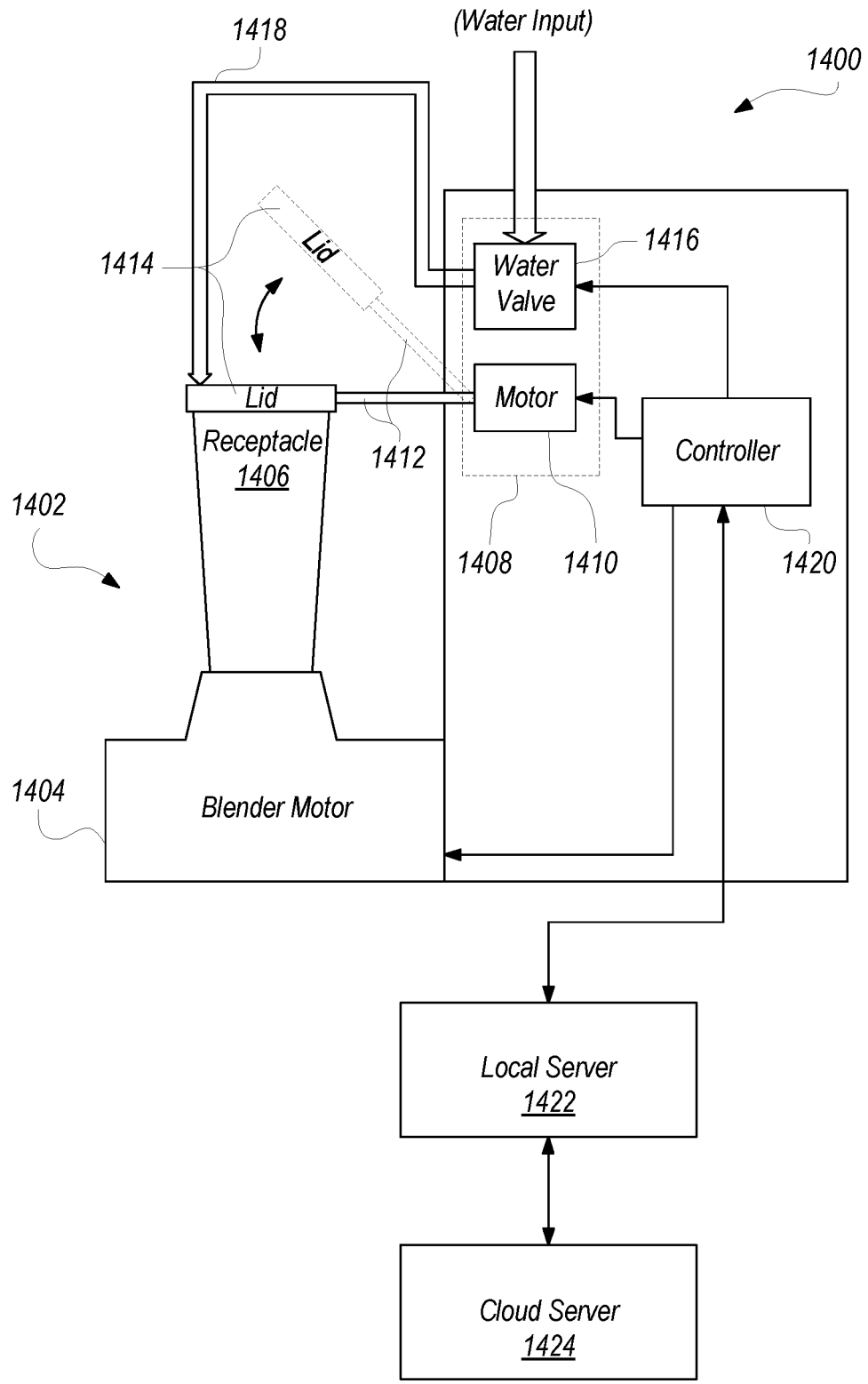
FIG. 14 is a functional diagram of an automated lid blender system according to an embodiment.

FIG. 14 is a functional diagram of an automated lid blender system 1400 according to an embodiment. The automated lid blender system 1400 includes a blender 1402 including a base with a blender motor 1404 and a blender receptacle 1406 removably attachable to the base. A lid control mechanism 1408 includes a motor 1410 that controls a lid arm 1412 coupled to a blender lid 1414 to control placement of the blender lid on or removal of the blender lid from an opening of the blender receptacle 1406. The dashed lines for the lid arm 1412 and blender lid 1414 show the blender lid in the open position while the solid lines for these components show the blender lid in the closed position covering the opening of the blender receptacle 1406. The lid control mechanism 1408 further includes a water valve 1416 that receives input water and controls the flow of water through a flexible tube 1418 attached to the lid 1414 and into the blender receptacle 1406.

A controller 1420 controls the operation of the motor 1410 to open or close the blender lid 1414 and controls the water valve 1416 to control the flow of water into the blender receptacle 1406. The controller 1420 also controls the blender motor 1404 during a cleaning cycle of the receptacle 1406, as will be described in more detail below. The controller 1420 may be coupled to a local server 1422 that communicates with the controller 1420 to control operation of the controller, such as to initiate a cleaning cycle of the blender receptacle 1406. A cloud server 1424 may also communicate with the local server 1422 to communicate information such as changes to motor control algorithms utilized by the controller 1420 during cleaning cycles of the blender receptacle 1406.

In one embodiment, during a cleaning cycle of the blender receptacle 1406, the controller 1420 controls the water valve 1416 to dispense a predetermined amount of water through the flexible tube 1418 and into the blender receptacle 1406. The controller 1420 thereafter controls the motor 1410 to increase the rotations per minute (RPMS) of the motor 1410 over time, from an initial minimum level to a maximum level. In an embodiment, after the controller 1420 controls the RPMS of the motor 1410 to the maximum level, the controller thereafter alternately varies the RPMS of the motor between a lower value and the maximum value to thereby cause the water in the blender receptacle to splash against and clean the blender lid 1414 during the cleaning cycle. The controller 1420 may alternately vary the RPMS of the motor 1410 between other values, one higher value and one lower value, during the cleaning cycle.

FURTHER EXAMPLE EMBODIMENTS

The present disclosure may be implemented using a variety of combinations of methods, structures, and/or techniques illustrated by the examples above.

In one embodiment, the present disclosure includes an apparatus, comprising: a blender lid configured to cover an opening in a blender receptacle; and a lid arm coupled to the blender lid and coupled rotationally about a first horizontal axis, the lid arm configured to rotate about the first horizontal axis to selectively position the blender lid to cover and uncover the opening in the blender receptacle.

In one embodiment, an apparatus may further comprise a blender enclosure, wherein the lid arm is coupled to a mechanism detachably coupled to sidewalls of the blender enclosure.

In one embodiment, an apparatus may further comprise a motor coupled to the lid arm to rotate the lid arm about the first horizontal axis to cover the opening in the blender receptacle and to apply a downward force on the blender lid to seal the opening of the blender receptacle with the blender lid.

In one embodiment, the lid arm is comprised of a flexible material configured to allow three-dimensional movement of the blender lid relative to the blender receptacle, and wherein the blender lid and lid arm are movable in three-dimensions responsive to the downward force to prevent or reduce leakage of liquids in the blender receptacle through the opening during blending or cleaning in the blender receptacle.

In one embodiment, the lid arm comprises: a first radial element extending radially from the first horizontal axis, the first radial element having a first end configured to rotate about the first horizontal axis and a second end opposite the first end; a second element extending approximately orthogonally to the first radial element from the first end, the second element including a second end opposite the first end; and a third element extending approximately orthogonal to the second element, the third element including a third end opposite the second end, wherein the third element is coupled to the blender lid.

In one embodiment, an apparatus may further comprise a fourth element configured between the third element and the blender lid, wherein the fourth element is rotationally coupled to the blender lid.

In one embodiment, the blender lid further comprises a vent.

In one embodiment, the vent is positioned on the horizontal top to reduce liquid from being released through the vent during blending and cleaning in the blender receptacle.

In one embodiment, the blender lid further comprises a vertical lid wall attached to a lower surface of the horizontal top, the vertical lid wall extending from the lower surface of the horizontal top into the opening of the blender receptacle upon placement of the blender lid onto the blender receptacle.

In one embodiment, the lid arm has a first end coupled rotationally about the first horizontal axis and a second end coupled to the blender lid rotationally about a second horizontal axis, the second horizontal axis being parallel to the first horizontal axis.

In one embodiment, the blender lid comprises an attachment device on an upper surface of the horizontal top, the attachment device including a semicircular groove configured to receive a cylindrical rod on the lid arm to rotatably attached the lid arm to the blender lid.

In one embodiment, an apparatus may further comprise a housing including a lid support guide configured to engage the blender lid to orient the blender lid upward.

In one embodiment, the blender lid further comprises an aperture configured to receive a flexible water tube to supply water into the receptacle during cleaning of the blender receptacle.

In one embodiment, the lid arm comprises a horizontal rod having a longitudinal axis corresponding to the first horizontal axis, and the horizontal rod having a first end attached to the blender lid.

In one embodiment, the blender lid has an upper surface and an opposing lower surface, and wherein the horizontal rod is configured to apply a downward force on the blender lid to seal the opening of the blender receptacle with the lower surface of the blender lid.

In one embodiment, the horizontal rod is configured to allow movement of the blender lid relative to the blender receptacle to enable the lower surface of the blender lid to planarly engage with and seal the opening of the blender receptacle to prevent or reduce leakage of liquids in the blender receptacle through the opening during blending or cleaning in the blender receptacle.

In one embodiment, the apparatus further comprises a motor coupled to a second end of the horizontal rod opposite the first end attached to the blender lid, the motor configured to rotate the blender lid about the first horizontal axis between a first position with the lower surface oriented upward and a second position with the lower surface oriented downward.

In one embodiment, the motor is further configured to rotate the blender lid about the horizontal axis to the first position after blending of ingredients in the blender receptacle to reduce dripping of ingredients from the lower surface of the horizontal top after the blending of ingredients in the blender receptacle.

In one embodiment, an apparatus may further comprise a removable seal covering the lower surface of the blender lid. The removable seal may be elastic, for example, to engage around edges of the lower surface and be removeable from the lower surface by stretching back the edges.

In one embodiment, the removable seal further comprises a vent configured to release pressure formed in the blender receptacle during blending and cleaning of the blender receptacle.

In one embodiment, the vent comprises an L-shaped vent in a center portion of the horizontal top.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus, comprising:
   a controller;
   a blender motor;
   a blender lid configured to cover an opening in a blender receptacle, the blender lid further comprising a pressure release vent configure to release pressure formed in the blender receptacle and to prevent blended ingredients from being forced through the pressure vent during blending;
   a lid arm coupled to the blender lid and coupled rotationally about a first horizontal axis, the lid arm configured to rotate about the first horizontal axis to selectively position the blender lid to cover and uncover the opening in the blender receptacle; and
   a flexible water tube to supply water into the blender receptacle during cleaning of the blender receptacle, wherein the blender lid further comprises an aperture coupled to the flexible water tube to supply water into the blender receptacle during a cleaning cycle of the blender receptacle, wherein the flexible water tube is coupled between the aperture and an electronically controlled water valve,
   wherein during the cleaning cycle:
      the controller controls the water valve to dispense a predetermined amount of water through the flexible water tube and into the receptacle; and
      the controller controls the blender motor to vary the rotations per minute of the blender motor to clean the receptacle.

2. The apparatus of claim 1 further comprising a blender enclosure, wherein the lid arm is coupled to a mechanism detachably coupled to sidewalls of the blender enclosure.

3. The apparatus of claim 1 further comprising a motor coupled to the lid arm to rotate the lid arm about the first horizontal axis to cover the opening in the blender receptacle and to apply a downward force on the blender lid to seal the opening of the blender receptacle with the blender lid.

4. The apparatus of claim 3, wherein the lid arm is comprised of a flexible material configured to allow three-dimensional movement of the blender lid relative to the blender receptacle, and wherein the blender lid and lid arm are movable in three-dimensions responsive to the downward force.

5. The apparatus of claim 1, wherein the lid arm comprises:
   a first radial element extending radially from the first horizontal axis, the first radial element having a first end configured to rotate about the first horizontal axis and a second end opposite the first end;
   a second element extending approximately orthogonally to the first radial element from the first end, the second element including a second end opposite the first end; and
   a third element extending approximately orthogonal to the second element, the third element including a third end opposite the second end,
   wherein the third element is coupled to the blender lid.

6. The apparatus of claim 1, wherein the blender lid further comprises a vertical lid wall attached to a lower surface of a horizontal top, the vertical lid wall extending from the lower surface of the horizontal top into the opening of the blender receptacle upon placement of the blender lid onto the blender receptacle.

7. The apparatus of claim 1, wherein the lid arm has a first end coupled rotationally about the first horizontal axis and a second end coupled to the blender lid rotationally about a second horizontal axis, the second horizontal axis being parallel to the first horizontal axis.

8. The apparatus of claim 1, wherein the blender lid comprises an attachment device on an upper surface of a horizontal top, the attachment device including a semicircular groove configured to receive a cylindrical rod on the lid arm to rotatably attached the lid arm to the blender lid.

9. The apparatus of claim 1 further comprising a housing including a lid support guide configured to engage the blender lid to orient the blender lid upward.

10. The apparatus of claim 1, wherein the lid arm comprises a horizontal rod having a longitudinal axis corresponding to the first horizontal axis, and the horizontal rod having a first end attached to the blender lid.

11. The apparatus of claim 10, wherein the blender lid has an upper surface and an opposing lower surface, and wherein the horizontal rod is configured to apply a downward force on the blender lid to seal the opening of the blender receptacle with the lower surface of the blender lid.

12. The apparatus of claim 11, wherein the horizontal rod is configured to allow movement of the blender lid relative to the blender receptacle to enable the lower surface of the blender lid to planarly engage with and seal the opening of the blender receptacle to prevent or reduce leakage of liquids in the blender receptacle through the opening during blending or cleaning in the blender receptacle.

13. The apparatus of claim 10, wherein the apparatus further comprises a second motor coupled to a second end of the horizontal rod opposite the first end attached to the blender lid, the second motor configured to rotate the blender lid about the first horizontal axis between a first position with the lower surface oriented upward and a second position with the lower surface oriented downward.

14. The apparatus of claim 13, wherein the second motor is further configured to rotate the blender lid about the horizontal axis to the first position after blending of ingredients in the blender receptacle to reduce dripping of ingredients from the lower surface of the blender lid after the blending of ingredients in the blender receptacle.

15. The apparatus of claim 1, further comprising a removable seal covering the lower surface of the blender lid.

16. The apparatus of claim 1, wherein the pressure release vent is L-shaped.

17. The apparatus of claim 1, wherein the pressure release vent is configured above a cut out.

\* \* \* \* \*